United States Patent
Grützner et al.

(10) Patent No.: US 9,428,613 B2
(45) Date of Patent: Aug. 30, 2016

(54) PROCESS FOR PRODUCING POLYAMIDE THAT IS STABLE DURING PROCESSING

(71) Applicant: BASF SE, Ludwigshafen (DE)

(72) Inventors: Rolf-Egbert Grützner, Rudolstadt (DE); Shankara Narayanan Keelapandal Ramamoorthy, Mannheim (DE); Faissal-Ali El-Toufaili, Ludwigshafen (DE); Achim Gerstlauer, Limburgerhof (DE); Achim Stammer, Freinsheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/092,071

(22) Filed: Nov. 27, 2013

(65) Prior Publication Data

US 2014/0088268 A1     Mar. 27, 2014

Related U.S. Application Data

(63) Continuation of application No. 13/226,568, filed on Sep. 7, 2011, now abandoned.

(60) Provisional application No. 61/381,446, filed on Sep. 10, 2010.

(51) Int. Cl.
| | | |
|---|---|---|
| C08G 69/00 | (2006.01) | |
| C08L 77/00 | (2006.01) | |
| C08G 69/48 | (2006.01) | |
| C08G 69/46 | (2006.01) | |

(52) U.S. Cl.
CPC .............. *C08G 69/48* (2013.01); *C08G 69/46* (2013.01)

(58) Field of Classification Search
None
See application file for complete search history.

(56) References Cited

U.S. PATENT DOCUMENTS

| | | | |
|---|---|---|---|
| 3,420,804 A |   | 1/1969 | Ramsey et al. |
| 3,840,500 A | * | 10/1974 | Ryffel et al. .................... 526/65 |
| 5,955,569 A | * | 9/1999 | Dujari et al. ................. 528/480 |
| 6,069,228 A | * | 5/2000 | Alsop et al. .................. 528/310 |
| 6,268,468 B1 |   | 7/2001 | Ilg et al. |
| 8,703,879 B2 |   | 4/2014 | Loth et al. |
| 2011/0245366 A1 |   | 10/2011 | Gehringer et al. |
| 2012/0157594 A1 |   | 6/2012 | Schmidt et al. |
| 2012/0157654 A1 |   | 6/2012 | El-Toufalli et al. |
| 2012/0245308 A1 |   | 9/2012 | El-Toufalli et al. |

FOREIGN PATENT DOCUMENTS

| | | |
|---|---|---|
| EP | 0038094 A2 | 10/1981 |
| EP | 0437155 B1 | 2/1995 |
| EP | 1333049 A2 | 8/2003 |
| GB | 1069048 A | 5/1967 |
| WO | WO-02/04561 A2 | 1/2002 |
| WO | WO-2007/085406 A1 | 8/2007 |
| WO | WO-2009/153340 A1 | 12/2009 |
| WO | WO-2011/069892 A1 | 6/2011 |

OTHER PUBLICATIONS

Olmsted et al., "Steam Distillation of the Lower Volatile Fatty Acids From a Saturated Salt Solution", J. Biol. Chem., vol. 85, pp. 109-114 (1929).

Hardman et al., "Metabolism of W-Amino Acids" Journal of Biological Chemistry, vol. 238, pp. 2081-2087 (1963).

* cited by examiner

*Primary Examiner* — Ana Woodward

(74) *Attorney, Agent, or Firm* — Drinker Biddle & Reath LLP

(57) ABSTRACT

Process for producing polyamides that are stable during processing, by treating the polyamide during the solid-phase postcondensation process with a gas which comprises carrier gas (inert gas), water, and acid, or an anhydride or lactone or a mixture of these or, respectively, comprises ammonia, or amine, or a mixture of these, at a temperature from 130 to 200° C. and at a pressure of from 0.01 to 10 bar.

20 Claims, No Drawings

PROCESS FOR PRODUCING POLYAMIDE THAT IS STABLE DURING PROCESSING

CROSS REFERENCE TO RELATED APPLICATIONS

This application is a continuation of U.S. application Ser. No. 13/226,568, filed on Sep. 7, 2011, the contents of which is incorporated herein by reference in its entirety. U.S. application Ser. No. 13/226,568 claims the benefit of U.S. Provisional Application No. 61/381,446, filed Sep. 10, 2010, the contents of which is incorporated herein by reference in its entirety.

BACKGROUND OF THE INVENTION

The present invention relates to a process for producing polyamides with increased stability during processing.

WO-A-02/4561 (U.S. Pat. No. 6,268,468) discloses a process for treating a polyamide present in the solid state, where the polyamide is treated with an inert carrier gas composed of nitrogen or of argon, and this carrier gas comprises a gaseous acid or a gaseous anhydride, or an amine.

EP-A-1 333 049 discloses the stabilization of dried and demonomerized nylon-6 with selected lactones or anhydrides in an additional downstream processing step in the melt.

Said processes are not yet satisfactory.

SUMMARY OF THE INVENTION

An object of the present invention was therefore to eliminate the above-mentioned disadvantages.

Accordingly, a novel and improved process has been discovered for producing polyamides that are stable during processing, and comprises treating the polyamide during the solid-phase postcondensation process with a gas which comprises carrier gas (inert gas), water, and acid, or an anhydride or lactone or a mixture of these or, respectively, comprises ammonia, or amine, or a mixture of these, at a temperature from 130 to 200° C. and at a pressure of from 0.01 to 10 bar.

The process of the invention can be carried out as follows:

During the solid-phase postcondensation of polyamide, the polyamide can be treated with a gas which comprises carrier gas (inert gas), water, and
a) acid, or anhydride, or lactone, or a mixture of these or, respectively,
b) ammonia, or amine, or a mixture of these,
or can be treated in succession with a) prior to b), or with b) prior to a), at temperatures of from 130 to 200° C., preferably from 140 to 180° C., particularly preferably from 150 to 175° C., and at a pressure of from 0.01 to 10 bar, preferably from 0.1 to 5 bar, particularly preferably at atmospheric pressure. The treatment time can vary widely but is generally from 1 to 100 hours, preferably from 2 to 60 hours, particularly preferably from 10 to 50 hours, in particular from 15 to 40 hours.

A DETAILED DESCRIPTION OF THE INVENTION

The gas used can generally be obtained by metering a mixture of steam-volatile components a) and, respectively, b) with water and with the inert gas directly into the carrier gas stream at the solid-phase-postcondensation apparatus, or using ultrasound in the range from 25 kHz to 3 MHz, preferably 200 kHz to 3 MHz, particularly preferably from 400 kHz to 3 MHz, to atomize a mixture of non-steam-volatile components a) and, respectively, b) with water and with the inert gas, or heating to a temperature in the range from 100 to 300° C., preferably from 180 to 250° C., particularly preferably from 200 to 240° C., in particular from 210 to 230° C. and optionally using ultrasound for atomization.

The gas can by way of example be fed directly or with aid of an inert-gas-carrier stream at various locations into the solid-phase-postcondensation apparatus. In one preferred embodiment, it can be introduced at the upper end of the postcondensation apparatus (about ⅓ of the length below the top of the condensation apparatus). It is likewise possible to split the gas stream into two separate feeds or to feed all of the gas at the lower end of the solid-phase-postcondensation apparatus. In one particularly preferred embodiment, in the case of addition of the additive/carrier-gas stream at the upper end of the postcondensation apparatus and, associated therewith, the passage of the gas across the polyamide, preferably through the polyamide, it is possible by way of example to operate cocurrently. The additives used can be dissolved in water prior to introduction into the postcondensation apparatus, and concentrations here are generally from 0.001 to 10% by weight, preferably from 0.01 to 5% by weight, particularly preferably from 0.02 to 1% by weight. This solution can then be mixed with the carrier gas and, when steam-volatile additives are used, heated to a temperature in the range from 100 to 300° C., preferably 180 to 250° C., particularly preferably from 200 to 240° C., in particular from 210 to 230° C., and also then optionally fed into the postcondensation apparatus. If non-steam-volatile additives are used, an aqueous solution can likewise be produced, and this can be atomized at room temperature and then the procedure can be analogous to that for steam-volatile additives.

The water can be added
a. to the mixture made of inert gas and acid, or anhydride, or lactone, or a mixture of these or, respectively, ammonia, or amine, or a mixture of these, or
b. to the inert gas, or
c. in the form of aqueous acid, or anhydride, or lactone, or a mixture of these or, respectively, aqueous ammonia, or amine, or a mixture of these.

In the case of the solid-phase-condensation process as part of the polyamide production process (described in D below), the material present is usually granules with a bulk density of from 500 to 900 kg/m$^3$, preferably from 600 to 800 kg/m$^3$, particularly preferably from 700 to 800 kg/m$^3$, and, respectively, with a diameter of from 1 to 4 mm preferably from 1.5 to 3 mm, particularly preferably from 2 to 2.5 mm.

The polyamide used for the solid-phase-condensation process can be produced as follows:
A) melt polymerization (see also R. Vieweg; A. Müller; Kunststoff-Handbuch [Plastics handbook], volume VI, Polyamide [Polyamides]; C. Hanser Verlag 1966, pp. 190 ff) Liquid caprolactam can be polycondensed using small amounts of water as reaction initiator in a 1- or 2-stage process at temperatures of from 240° C. to 270° C. by way of the melt. This process uses by way of example a PC tube, at the end of which the melt can be cooled and granulated.
B) Hot water extraction (see also R. Vieweg; A. Müller; Kunststoff-Handbuch [Plastics handbook], volume VI, Polyamide [Polyamides]; C. Hanser Verlag 1966, p. 193+ references)

Here, the removal of residual monomer and oligomers from the polyamide can be achieved by extraction with hot water, e.g. countercurrently. The polyamide granules, still moist after extraction, can then be subjected to one of the following processes C) Drying (see also R. Vieweg; A. Müller; Kunststoff-Handbuch [Plastics handbook], volume VI, Polyamide [Polyamides]; C. Hanser Verlag 1966, p. 194+references)

This third step of a process can follow the hot water extraction process, and comprises the drying of the granules after extraction, from a residual moisture level of about 10% by weight down to from 1 to 2% by weight.

D) Solid-phase-postcondensation process (analogous references)

After extraction and pre-drying, the granules can be heat-conditioned in the solid state with exclusion of atmospheric oxygen in a closed system. The usual method of exclusion of atmospheric oxygen is to generate an inert-gas atmosphere. The final product of this treatment process is a ready-to-process polyamide with a suitable level of viscosity and with greatly reduced residual moisture level.

The drying process (C) and solid-phase-postcondensation process (D) can also be combined in a single step, where by way of example in a tube used for this purpose the drying process can generally take place in the upper third and the postcondensation process can generally take place in the lower two thirds of the available length of the tube, with exclusion of oxygen.

The addition of the additives described for achieving the increased stability during processing is implemented in the invention during the solid-phase-postcondensation process D) or, respectively, in the combined drying/postcondensation tube within the carrier stream in the form of gas, or in the form of atomized steam/additive mixture.

Polyamides are long-chain synthetic polymers having amide groups (—CO—NH—) in the main polymer chain. Among examples of these polyamides are homopolyamides, obtained via polymerization of lactams or of dicarboxylic acids and of diamines, and copolymerization products derived from mixtures of diamines, of dicarboxylic acids, and of lactams.

Examples of suitable polyamides are nylon-6, nylon 6,6, nylon-6/6,6, nylon-6,9, nylon-6,10, nylon-6,T, nylon-6,1/6,T, nylon-6,12, nylon-11, nylon-12, nylon-4,6, nylon-MXD6, and copolymers, and mixtures of these, preferably nylon-6, nylon-6,6 and nylon-6/6,6, particularly preferably nylon-6.

The hot gas generally comprises, based on the polyamide used, a carrier gas and from 0.001 to 20% by weight, preferably from 0.1 to 15% by weight, particularly preferably from 1 to 10% by weight, of water, and from 0.001 to 10% by weight, preferably from 0.01 to 5% by weight, particularly preferably from 0.02 to 1% by weight, of acid, or anhydride, or lactone, or a mixture of these or, respectively, ammonia, or amine, or a mixture of these.

A suitable carrier gas is any of the gases that are inert under the processing conditions, examples being helium, neon, argon, krypton, and nitrogen, preferably nitrogen or argon, particularly preferably nitrogen.

Suitable acids are inorganic or organic acids.

Suitable inorganic acids are oxo acids of phosphorus, e.g. phosphoric acid, phosphonic acid, phosphinic acid, and also phosphonates, i.e. organophosphorus compounds comprising phosphonic acid, e.g. 2-aminoethylphosphonic acid (AEPN), 1-hydroxyethylidene-1,1-diphosphonic acid (HEDP), aminotris(methylenephosphonic acid) (ATMP), ethylenediaminetetra(methylenephosphonic acid) (EDTMP), tetramethylenediaminetetra(methylenephosphonic acid) (TDTMP), hexamethylenediaminetetra(methylenephosphonic acid) (HDTMP), diethylenetriaminepenta (methylenephosphonic acid) (DTPMP), 2-carboxyethylphosphonic acid (CEPA), preferably phosphoric acid, phosphonic acid, and diethylenetriaminepenta (methylenephosphonic acid) (DTPMP), particularly preferably phosphoric acid.

Suitable organic acids are short- and long-chain, and also branched aliphatic or aromatic, monocarboxylic acids of the general formula $R^1$—COOH, in which $R^1$ is hydrogen, $C_1$-$C_{10}$-alkyl, preferably $C_1$-$C_8$-alkyl, particularly preferably $C_1$-$C_4$-alkyl, such as methyl, ethyl, n-propyl, isopropyl, n-butyl, isobutyl, sec-butyl, or tert-butyl, in particular ethyl or n-propyl, and phenyl, examples being formic acid, acetic acid, propionic acid, benzoic acid, and pivalic acid, preferably acetic acid and propionic acid, particularly preferably propionic acid.

Suitable anhydrides are noncyclic anhydrides of the general formula $R^1$—C=O—O—O=C—$R^2$, in which $R^1$ and $R^2$ are identical or different and are $C_1$-$C_{10}$-alkyl, preferably $C_1$-$C_8$-alkyl, particularly preferably $C_1$-$C_4$-alkyl, such as methyl, ethyl, n-propyl, isopropyl, n-butyl, isobutyl, sec-butyl, or tert-butyl, in particular methyl or ethyl, and also cyclic anhydrides of the general formula —$R^3$—C=O—O—O=C—, in which —$R^3$— is an alkylene moiety having from 2 to 6 carbon atoms, preferably from 2 to 4 carbon atoms, particularly preferably from 2 to 3 carbon atoms, alkenylene having from 2 to 6 carbon atoms, preferably from 2 to 4 carbon atoms, particularly preferably 2 carbon atoms, alkynylene having from 2 to 6 carbon atoms, preferably from 2 to 4 carbon atoms, particularly preferably 2 carbon atoms, e.g. acetic anhydride, succinic anhydride, glutaric anhydride, maleic anhydride, phthalic anhydride, preferably succinic anhydride, glutaric anhydride, and maleic anhydride, particularly preferably succinic anhydride and glutaric anhydride.

Suitable lactones are γ-, δ-, and ε-lactones, e.g. butyrolactone, valerolactone, and caprolactone, preferably butyrolactone and caprolactone, particularly preferably caprolactone. Suitable amines are primary amines $R^1$—$NH_2$, secondary amines $R^1R^2$—NH, tertiary amines $R^1R^2R^3$—N and quaternary amines $R^1R^2R^3R^4$—$N^+(X^-)$, in which $R^1$, $R^2$, $R^3$, $R^4$, independently of one another, are $C_1$-$C_{20}$-alkyl, preferably $C_1$-$C_8$-alkyl, particularly preferably $C_1$-$C_4$-alkyl, e.g. methyl, ethyl, n-propyl and isopropyl, $C_3$-$C_{20}$-cycloalkyl, preferably $C_3$-$C_8$-cycloalkyl, e.g. cyclopropyl, cyclobutyl, cyclopentyl, cyclohexyl, cycloheptyl, and cyclooctyl, particularly preferably cyclopentyl, cyclohexyl, cycloheptyl, and cyclooctyl, aryl, such as phenyl, 1-naphthyl, and 2-naphthyl, $C_7$-$C_{20}$-alkylaryl, preferably $C_7$-$C_{12}$-alkylphenyl, e.g. benzyl and phenylethyl, $C_8$-$C_{20}$-alkylarylalkyl, preferably $C_7$-$C_{16}$-alkylphenylalkyl, e.g. 2-methylbenzyl and 2-methylphenylethyl, and X is halogen, such as fluorine, chlorine, bromine, or iodine, preferably chlorine or bromine, particularly preferably chlorine, and particularly preferably $C_7$-$C_{12}$-alkylphenylalkyl, e.g. 2-methylbenzyl, $C_1$-$C_{20}$-amines, preferably $C_1$-$C_8$-amines, e.g. methylamine, dimethylamine, ethylamine, n-propylamine, 2-propylamine, n-butylamine, primary butylamine, sec-butylamine, tert-butylamine, n-pentylamine, 2-pentylamine, 3-pentylamine, n-hexylamine, 2-hexylamine, 3-hexylamine, n-heptylamine, 2-heptylamine, 3-heptylamine, 4-heptylamine, n-octylamine, 2-octylamine, 3-octylamine, cyclopropylamine, cyclobutylamine, cyclopentylamine, cyclohexylamine, cycloheptylamine, cyclooctylamine, 1,1,3,3-tetramethylbutylamine, N-ethylmethylamine, dimethylamine, diethylamine, di-n-propylamine, diisopropylamine, di-n-butylamine, di-sec-butylamine, di-n-pentylamine, N-methylpropylamine, N-ethylpropylamine, particularly preferably methylamine, dimethylamine, and cyclohexylamine, and $C_2$-$C_{20}$-diamines, preferably $C_2$-$C_8$-diamines, e.g. 1,2-diaminopropane, 1,3-diaminopropane, 1,2-diaminobutane, 1,3-diaminobutane, and 1,4-diaminobutane, and particularly preferably $C_2$-$C_6$-diamine.

Ammonia is particularly preferred.

Use of acid, or anhydride, or lactone, or a mixture of these can reduce the number of terminal amino groups.

Use of ammonia, or amine, or a mixture of these, can reduce the number of terminal carboxy groups.

A high-viscosity polyamide produced in this way generally proves to be particularly stable during processing by melt extrusion through slot or annular dies to give flat or blown foils, or else through small-diameter annular dies to give monofils.

Processing in the invention generally reduces the amount of polyamides having a non-equimolar ratio of the terminal groups present (terminal amino and terminal carboxyl groups), and reduces the remonomerization rate during the extrusion process or during the melting process, and the viscosity reduction associated therewith, in particular for high-viscosity polyamide grades, and also reduces the content of regenerated monomers in the finished product, e.g. foil, monofils, fibers, or carpets.

The reduction in the number of terminal amino groups moreover proves advantageous for solution-dyed fibers, giving markedly reduced susceptibility to staining by way of example of carpets produced therefrom.

The process of the invention for treating the polyamides during the solid-phase-postcondensation process generally has very little or no adverse effect on the residence time required for the granules in the postcondensation stage. In contrast, surprisingly, the process is actually generally observed to be faster.

The polyamide produced in the invention can be used to produce a very wide variety of products. Among non-restricting examples of these products are foils, monofils, fibers, yarns, textile sheets, and the like.

Foils for flexible packaging made of polyamides such as nylon-6 and nylon 6/6,6 can be produced by melt extrusion, either in the form of flat foils (via slot dies) or else in the form of blown foils (via annular dies); high shear forces act on the polyamide melt here, depending on the dimensions of the system and on the throughput. The high viscosities (RV from 3.3 to 5.0) mainly used make this melt substantially more susceptible to reversal of the equilibrium between monomer and polymer, and also to thermal degradation. In both cases, the monomer epsilon-aminocaprolactam is formed, and either escapes as gas into the environment or condenses to give deposits on cooled parts of the system. Despite the use of advanced suction-removal systems, in particular on flat-foil systems, die deposits or chill-roll deposits occur, and after a certain operating time these lead to contamination on the resultant foil and to stoppages for cleaning. These stoppages for cleaning interrupt foil manufacture and lead to unsatisfactory finished-product yield.

Thermal degradation of high-viscosity polyamides moreover leads to a reduction of average chain lengths, and this can be demonstrated by relative viscosity measurements. Said process becomes exacerbated under more aggressive processing conditions, e.g. higher processing temperatures, thus limiting the throughput of systems for producing, for example, foils.

When polyamides produced in the invention are used, the extent of thermal degradation giving shortened polymer chains and, respectively, lower viscosities can be reduced, and the extent of reversion to monomer can be reduced, as also can the number of stoppages for cleaning associated therewith, and yield can therefore be improved.

In the context of this invention, the expression stable during processing means substantially more robust behavior during processing in the melt to give, for example, foils, monofils, fibers, or other products, where this behavior features reduced viscosity degradation, and also less reversion and release of caprolactam monomer, even under relatively aggressive processing conditions.

EXPERIMENTAL SECTION/EXAMPLES

Example 1

Effect of Nitrogen Moisture Level on the Solid-Phase-Polycondensation Process without Additives The solid-phase-polycondensation reactor was composed of a double-walled cylindrical steel vessel of length 1000 mm and of internal diameter 100 mm, and of a jacket with thermostat. The tube had been positioned above a cone connected to a water-cooled tube. The cooling tube guided the granules to a location directly above the screw of a discharge screw conveyor. Above the reactor, the arrangement had an airlock with two ball valves through which the granules were introduced.

The reactor had various gas inlets. The main gas inlet was at the bottom of the tube (in the cone). The gas inlet had a flow meter for the gas volume, and also three heat exchangers which heated the inlet gas to the desired temperature. Prior to the heat exchangers, the additives (water and capping agents) were introduced into the gas stream by way of HPLC pumps which introduced the desired amounts. The gas introduced was distributed within the granules by way of a perforated tube.

The polymer granules used comprised pre-extracted PA 6 granules with intrinsic viscosity 152 ml/g.

Material was charged to the reactor to give the fill level required, and the amount was noted (6 kg). The gas supply (nitrogen with various concentrations of water) was started. Once the reaction temperature had been reached, 350 g of granules were added, and were discharged at intervals of two hours so as to achieve an average residence time of 27 h in the tube. After 4 days of running time, the specimens were removed and analyzed.

Table 1 shows the intrinsic viscosities after 27 h of solid-phase-postcondensation process at 165° C. and 173° C. for treatment with nitrogen having various moistures levels.

TABLE 1

| Temperature [° C.] | Moisture level [%] | Nitrogen (bottom) [Nm$^3$/h] | Nitrogen (center) [Nm$^3$/h] | Intrinsic viscosity [ml/g] |
|---|---|---|---|---|
| — | — | — | — | 152 |
| 165 | 0 | 0.19 | 0.38 | 232 |
| 165 | 1.3 | 0.19 | 0.38 | 230 |
| 165 | 6.2 | 0.19 | 0.38 | 220 |
| 173 | 0 | 0.19 | 0.38 | 255 |
| 173 | 6.2 | 0.19 | 0.38 | 246 |

Example 2

Gas-Phase Modification During Stage D) Solid-Phase-Postcondensation Process Using Various Acids and Acid Derivatives (Batchwise Procedure: Batch Process, Water/Additive Mixtures)

6250 g of polyamide granules were predried for 9 h at 140° C. and charged to the reactor, heated to 173° C., and flushed with 2000 l/h of nitrogen. Once the temperature had been reached, a stream of steam comprising from 1 to 10% by weight of acid, anhydride, lactone, or amine (flow rate 13.5 g/h) was admixed with the stream of nitrogen (300 N l/h). Said stream of steam was generated by using an HPLC pump to feed (84 g/h) a solution comprising from 1 to 10% by weight of acid, of anhydride, of lactone, or of amine by way of a heat exchanger. The experiment ran for 30 h, with a 1 kg specimen discharged every 10 h. Prior to every removal of specimen, 500 g of material was discharged, in order to ensure homogeneity of the specimen.

Table 2 collates the results for various acids, anhydrides, lactones, and amines:

TABLE 2

| Additive | Additive (% by wt.)** | IV (ml/g) | d (IV) (ml/g) | Monomer (%) | Δ % monomer |
|---|---|---|---|---|---|
| None | 0 | 202 | — | 0.165 | — |
| Formic acid | 5 | 179 | −11.39% | 0.13 | −21.20% |
| Propionic acid | 5 | 203 | 0.5% | 0.15 | −9.10% |
| Phosphoric acid | 1 | 206 | 2.0% | 0.14 | −15.50% |
| Diethyl phosphate | 5 | 203 | 0.5% | 0.15 | −9.10% |
| DTPMP* | 1 | 200 | −1.0% | 0.17 | 3.00% |
| DTPMP* | 2 | 184 | −8.9% | 0.16 | −3.03% |
| Caprolactone | 5 | 189 | −6.43% | 0.14 | −9.10% |

*= Diethylenetriaminepenta(methylenephosphonic acid) (DTPMP),
**= Percent by weight of the additives used in an aqueous solution

Example 3

Gas-Phase Modification Using Various Acids and Acid Derivatives (Continuous Procedure, Water/Additive Mixtures)

The additives used were dissolved in water. Column 2 of tables 3 and 4 shows the concentrations used for the aqueous solutions. 4% by volume of nitrogen carrier gas was admixed with the aqueous solutions prior to addition to a continuous solid-phase-postcondensation apparatus (height: 1 meter; diameter: 0.1 meter; throughput of granules: 0.15 kg/h). This additive/water/$N_2$ mixture was introduced into the hot stream of nitrogen (220° C.) and metered at various addition sites, which depended on the arrangement of the experiment. The total amount of nitrogen (0.366 N m$^3$/h at 20° C. and 3.5 bar) was divided as follows: 15% (0.0549 N m$^3$/h) metered after about ⅓ of the processing length from the upper end of the top of the tube of the solid-phase-postcondensation apparatus, and 85% (0.23113 N m$^3$/h) at the end of the tube. The throughput of the nitrogen loaded with additives was 0.554 N m$^3$/kg of PA 6 at 170° C. and atmospheric pressure (1 bar), and the amount of water entrained was 15.566 g/h. In the case of experimental additives designated by "-M" (column 1, tables 3 and 4), additive/water solution was metered at the upper addition location (⅓ of the processing length, as described).

The experiments were run continuously at 167° C. in the solid-phase-postcondensation apparatus, and the residence time for the granules here was kept constant at 34 h. Differences in the resultant intrinsic viscosities (IV), and also monomer contents, can be seen in Table 3. Additive concentrations from 100 ppm of additive/kg of PA 6 to 10 000 ppm/kg of PA 6 were studied in the experiments, and the range from 100 ppm of additive/kg of PA 6 and 2000 ppm/kg of PA 6 has proven particularly suitable here.

Table 3 collates the results for a number of different acids, anhydrides, lactones, and amines.

TABLE 3

| Additive | Additive (% by wt.) | IV (ml/g) | d (IV) (ml/g) | Monomer (%) | Δ % monomer |
|---|---|---|---|---|---|
| None (B36) | 0 | 215 | — | 0.35 | — |
| Formic acid | 2 | 216 | 0.47% | 0.14 | −60.00% |
| Formic acid | 5 | 176 | −18.14% | 0.13 | −62.86% |
| Formic acid - M* | 2 | 221 | 2.79% | 0.25 | −28.57% |
| Propionic acid | 5 | 226.7 | 5.44% | 0.16 | −54.29% |
| Propionic acid - M* | 5 | 236 | 9.77% | 0.18 | −48.57% |
| DTPMP | 0.5 | 224.3 | 4.33% | 0.18 | −48.57% |
| DTPMP | 1 | 206.7 | −3.86% | 0.2 | −42.86% |
| DTPMP - M* | 1 | 241 | 12.09% | 0.15 | −57.14% |
| Propylamine | 5 | 235.3 | 9.44% | 0.21 | −40.00% |

*= Addition site in the "middle" means about ⅓ of the processing length below the top of the tube of the solid-phase-postcondensation apparatus

Example 4

Gas-Phase Modification Using Various Acids and Acid Derivatives (Continuous Procedure, Ultrasound Atomization of Aqueous Solutions of Nonvolatile Additives)

The ultrasound atomizer used for the atomization experiments was a Megasonic Sonosys from Sonosys Ultraschallsysteme GmbH, Neuenburg, Germany. The additive/water mixtures were produced by analogy with example 3. The atomization was achieved in the range from 400 kHz to 3 MHz at room temperature. The atomized mixture was also enriched with 4% by volume of nitrogen, and fed into the hot (220° C.) nitrogen silicate at the position M described in example 3.

The structure of the continuous solid-phase-postcondensation apparatus for the experiment, and also all of the operating parameters used, were the same as those specified in example 3.

Table 4 collates the results for a number of different acids, anhydrides, lactones, and amines.

TABLE 4

| Additive | Additive (% by wt.) | IV (ml/g) | d (IV) (ml/g) | Monomer (%) | Δ % monomer |
|---|---|---|---|---|---|
| None | 0 | 215 | — | 0.35 | — |
| 0.1% $H_3PO_4$* - M | 1** | 296.4 | 42% | 0.14 | −60% |
| 0.1% Propionic acid - M | 1 | 234.7 | 12% | 0.17 | −51% |
| 0.2% Propionic acid - M | 2 | 243.8 | 17% | 0.15 | −57% |
| 0.025% | 0.25 | 254.5 | 22% | 0.15 | −57% |

TABLE 4-continued

| Additive | Additive (% by wt.) | IV (ml/g) | d (IV) (ml/g) | Monomer (%) | Δ % monomer |
|---|---|---|---|---|---|
| DTPMP - M 0.00625% DTPMP - M | 0.125 | 237 | 13% | 0.23 | −34% |

*= 0.1% $H_3PO_4$ = concentration of additive/kg of PA 6
**= Concentration of aqueous solution used Example 5

Stability During Processing of Polyamide Modified in Examples 3 and 4, During Extrusion to Give Flat Foils 50 μm single-layer PA 6 foils were produced in a flat-foil system (Barmag 90 mm single-screw extruder, 25D processing length+slot die, throughput 40 kg/h) (melt temperature 280° C., melt residence time 8 min). The plastified melt was run onto a chill roll (20° C.), and the foils were wound up. HPLC was used on specimens of the resultant foils to determine the composition of the extract, in particular the absolute content of caprolactam.

Tables 5 and 6 collate the results.

In this connection, table 5 comprises the intrinsic viscosities (IV), and also the residual monomer content measured (%), inclusive of the respective differences for gas-phase modification in the continuous process, and table 6 comprises the same information for the atomization method in the continuous process.

TABLE 5

| Additive | Additive (% by wt.) | IV (ml/g) | d (IV) (ml/g) | Monomer (%) | Δ % monomer |
|---|---|---|---|---|---|
| None (B36) | 0 | 217 | — | 0.41 | — |
| Formic acid | 2 | 214 | −3 | 0.23 | −43.90% |
| Formic acid | 5 | 165 | −52 | 0.16 | −60.98% |
| Formic acid - M | 2 | 210 | −7 | 0.36 | −12.20% |
| Propionic acid | 5 | 223 | 6 | 0.32 | −21.95% |
| Propionic acid - M | 5 | 213 | | 0.33 | −19.51% |
| DTPMP | 0.5 | 226 | 9 | 0.33 | −19.51% |
| DTPMP | 1 | 195 | −22 | 0.36 | −12.20% |
| DTPMP - M | 1 | 233 | 16 | 0.25 | −39.02% |
| Propylamine | 5 | 221 | 4 | 0.30 | −26.83% |

TABLE 6

| Additive | Additive (% by wt.) | IV (ml/g) | d (IV) (ml/g) | Monomer (%) | Δ % monomer |
|---|---|---|---|---|---|
| None | 0 | 209 | — | 0.42 | — |
| 0.1% $H_3PO_4$ | 1 | 279 | 33% | 0.27 | −36% |
| 0.1% Propionic acid | 1 | 230 | 10% | 0.24 | −43% |
| 0.2% Propionic acid | 2 | 232 | 11% | 0.23 | −45% |
| 0.025% DTPMP | 0.25 | 231 | 11% | 0.25 | −40% |
| 0.00625% DTPMP | 0.0625 | 227 | 9% | 0.29 | −31% |

The invention claimed is:

1. A process for producing a polyamide which comprises
1) preparing a gas by
   metering a mixture comprising
   a) an acid, an anhydride, a lactone, a mixture of the acid, the anhydride and the lactone, ammonia, an amine, or a mixture of ammonia and the amine,
   b) water, and
   c) a carrier gas inert at a temperature of from 130 to 200° C. and a pressure of from 0.01 to 10 bar to form a prepared gas
   directly into a stream comprising the carrier gas inert at a temperature of from 130 to 200° C. and a pressure of from 0.01 to 10 bar at a solid-phase postcondensation apparatus; and
2) subsequently treating a polyamide during solid-phase postcondensation process with the prepared gas at a temperature of from 130 to 200° C. and at a pressure of from 0.01 to 10 bar, yielding a polyamide which is stable during subsequent processing.

2. The process of producing the polyamide according to claim 1, wherein, based on the polyamide, the amount used is from 0.001 to 10% by weight of an acid, an anhydride, a lactone or a mixture of the acid, the anhydride and the lactone, or from 0.001 to 10% by weight of ammonia, an amine, or a mixture of ammonia and the amine.

3. The process for producing the polyamide according to claim 1, wherein the water is added
   a. to a mixture of component a) and the carrier gas inert at a temperature of from 130 to 200° C. and a pressure of from 0.01 to 10 bar,
   b. to the carrier gas inert at a temperature of from 130 to 200° C. and a pressure of from 0.01 to 10 bar, or
   c. in the form of an aqueous acid, an aqueous anhydride, an aqueous lactone, a mixture of the aqueous acid, the aqueous anhydride, and the aqueous lactone, an aqueous ammonia, an aqueous amine, or a mixture of the aqueous ammonia and the aqueous amine.

4. The process for producing the polyamide according to claim 1, wherein the prepared gas comprises from 0.001 to 20% by weight of water.

5. The process for producing the polyamide according to claim 1, wherein the carrier gas inert at a temperature of from 130 to 200° C. and a pressure of from 0.01 to 10 bar comprises nitrogen or argon.

6. The process for producing the polyamide according to claim 1, wherein the acid comprises formic acid, acetic acid, propionic acid, or a mixture thereof.

7. The process for producing the polyamide according to claim 1, wherein the acid comprises phosphoric acid, a mixture of phosphoric acid and formic acid, or propionic acid.

8. The process for producing the polyamide according to claim 1, wherein the acid comprises diethylenetriaminepenta (methylenephosphonic acid) (DTPMP), a mixture made of DTPMP with phosphoric acid and/or formic acid, or propionic acid.

9. The process for producing the polyamide according to claim 1, wherein the anhydride comprises succinic anhydride, glutaric anhydride, maleic anhydride, or phthalic anhydride.

10. The process for producing the polyamide according to claim 1, wherein the lactone comprises butyrolactone, valerolactone, or caprolactone.

11. A process which comprises
1) preparing a gas by
   atomizing a mixture comprising
   a) an acid, an anhydride, a lactone, a mixture of the acid, the anhydride and the lactone, ammonia, an amine, or a mixture of ammonia and the amine,
   b) water, and c) a carrier gas inert at a temperature of from 130 to 200° C. and a pressure of from 0.01 to 10 bar to form a prepared gas by ultrasound in the range from 25 KHz to 3 MHz; and 2) subsequently treating a polyamide during solid-phase postcondensation with the gas at a temperature of from 130 to 200° C. and at a pressure of from 0.01 to 10 bar, yielding a polyamide which is stable during subsequent processing.

12. The process for producing the polyamide according to claim 11, wherein the acid comprises phosphoric acid, a mixture of phosphoric acid and formic acid, or propionic acid.

13. The process for producing the polyamide according to claim 11, wherein the anhydride comprises succinic anhydride, glutaric anhydride, maleic anhydride, or phthalic anhydride.

14. The process for producing the polyamide according to claim 11, wherein the lactone comprises butyrolactone, valerolactone, or caprolactone.

15. The process for producing the polyamide according to claim 11, wherein component a) is distributed in the form of very fine droplets in components b) and c) with the aid of an ultrasound atomizer in the range from 25 kHz to 3 MHz, and wherein the mixture is passed into the carrier gas inert at a temperature of from 130 to 200° C. and a pressure of from 0.01 to 10 bar, and then also into a solid-phase-postcondensation apparatus.

16. A process for producing a polyamide, which comprises 1) preparing a gas by
   heating a mixture comprising
   a) an acid, an anhydride, a lactone, a mixture of the acid, the anhydride and the lactone, ammonia, an amine, or a mixture of ammonia and the amine,
   b) water, and
   c) a carrier gas inert at a temperature of from 130 to 200° C. and a pressure of from 0.01 to 10 bar to a temperature in the range from 100 to 300° C.; and 2) subsequently treating a polyamide during solid-phase postcondensation with the gas at a temperature of from 130 to 200° C. and at a pressure of from 0.01 to 10 bar, yielding a polyamide which is stable during subsequent processing.

17. The process for producing the polyamide according to claim 16, wherein the acid comprises phosphoric acid, a mixture of phosphoric acid and formic acid, or propionic acid.

18. The process for producing the polyamide according to claim 16, wherein the anhydride comprises succinic anhydride, glutaric anhydride, maleic anhydride, or phthalic anhydride.

19. The process for producing the polyamide according to claim 16, wherein the lactone comprises butyrolactone, valerolactone, or caprolactone.

20. The process for producing the polyamide according to claim 16, wherein an acid, an anhydride, a lactone, or a mixture of the acid, the anhydride, and the lactone, or ammonia, an amine, or a mixture of ammonia and the amine, is directly heated with the carrier gas inert at a temperature of from 130 to 200° C. and a pressure of from 0.01 to 10 bar and the water and passed into a solid phase postcondensation apparatus.

* * * * *